United States Patent

[11] 3,571,603

[72] Inventors John F. Bryant
 Lemon Grove;
 Will T. Hyde, Jr., Chula Vista, Calif.
[21] Appl. No. 774,737
[22] Filed Nov. 12, 1968
[45] Patented Mar. 23, 1971
[73] Assignee The United States of America as represented by the Secretary of the Navy

[54] OPTICAL READER AND CHARACTER IDENTIFICATION SYSTEM UTILIZING A TWO-DIMENSIONAL DIFFRACTING MEANS
6 Claims, 11 Drawing Figs.

[52] U.S. Cl. .................................................. 250/219,
 340/146.3, 356/71
[51] Int. Cl. ..................................................... G01n 21/30,
 G06k 9/00, G06k 9/08
[50] Field of Search .......................................... 356/71;
 250/219 (ICR); 340/146.3

[56] References Cited
 UNITED STATES PATENTS
 3,196,392 7/1965 Horwitz et al. ............... 356/71X
 3,437,824 4/1969 Lohmann ....................... 356/71X
 3,483,513 12/1969 Burckhardt et al. ........... 356/71X Primary Examiner—James W. Lawrence
Assistant Examiner—T. N. Grigsby
Attorneys—Joseph C. Warfield, George J. Rubens and John W. Mc Laren ABSTRACT: A source of collimated coherent light is arranged to impinge upon a character to be identified and a two-dimensional diffraction means is positioned in the path of the collimated light passing through the character to be identified, forming a plurality of spatially disposed diffraction patterns. Appropriate optical means of a determinable focal length is positioned one focal length from the position of the character to be identified, forming far-field images of the plurality diffraction patterns. A filter has a plurality of spaced discrete areas each defining the distinctive diffraction pattern of a known character by holographic techniques. Optical means integrates the light passing through the filter, diverting it to a first order, off-beam position. A plurality of light-responsive means, disposed in the first order off-beam position, and each related to a discrete area of the optical filter produces a signal in response to a predetermined amplitude of light passing through the filter, therefore identifying the character which was initially exposed to the source of collimated coherent light.

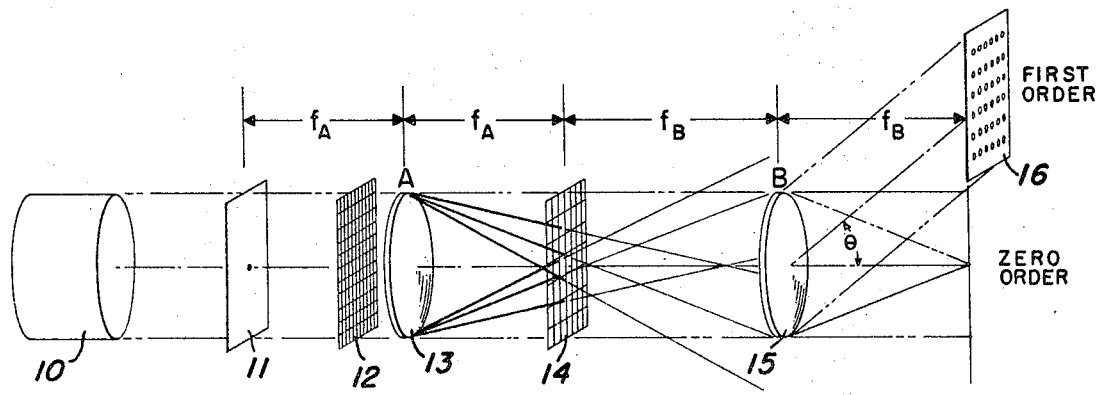
FIG. 1
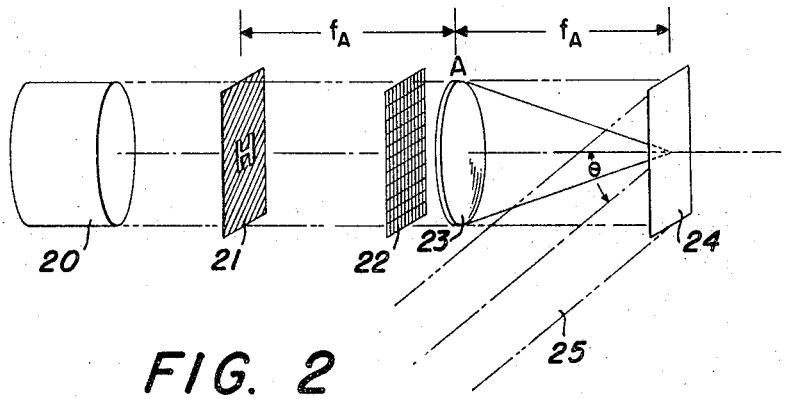
FIG. 2
FIG. 3
INVENTORS
JOHN F. BRYANT
BY WILL T. HYDE, JR.
ATTORNEYS

INVENTORS
JOHN F. BYRANT
WILL T. HYDE, JR.
ATTORNEYS

INVENTOR.
JOHN F. BRYANT
BY WILL T. HYDE, JR.

ATTORNEYS

OPTICAL READER AND CHARACTER IDENTIFICATION SYSTEM UTILIZING A TWO-DIMENSIONAL DIFFRACTING MEANS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A variety of different identification systems has been proposed for automatically identifying sequences of different characters, symbols, alphanumeric representations, etc. by principally optical means. Some of these systems have employed principles of the Fraunhofer diffraction phenomenon. One such system, for example, employs a source of coherent light which is directed to impinge upon a plane surface upon which the character to be identified is defined. A translucent member is positioned for displaying the single Fraunhofer diffraction pattern which is developed and a plurality of optical means is arranged to generate a like plurality of images of the single diffraction pattern. The plurality of such images is then directed to a mask or filter having a plurality of areas, each of which is distinguished by a different diffraction pattern representative of a particular distinctive character, symbol, alphanumeric, or arabic number, etc. it is desired to identify.

Other prior arts systems have employed the development of an optical image of the character or symbol to be identified to impinge upon a light-sensitive matrix which is scanned sequentially to develop matrix output signals characteristic of the image of the character or symbol and which can be analyzed or compared with stored information to identify the character or symbol represented by the matrix output signals.

All of these systems, however, develop a single diffraction pattern which is either analyzed or caused by a purely optical lens-type means to be reproduced for comparison with a mask or filter, matrix or other optically sensitive means to identify the character represented by the diffraction pattern.

SUMMARY OF THE INVENTION

The present invention contemplates a character identification system for rapidly and positively identifying characters, symbols, alphanumerics, arabic numbers, etc. which comprise a source of collimated coherent light, impinging upon a substantially plane surface having relatively opaque and transparent portions defining the character to be identified. A two-dimensional diffraction means is positioned in the path of the collimated coherent light which passes through the relatively opaque and transparent portions of the plane surface thus forming a plurality of spatially disposed diffraction patterns which are substantially identical and also distinctive of the character to be identified. Optical means having a predetermined focal length is positioned one focal length from the plane surface for forming a far-field image of the plurality of diffraction patterns. A spatial filter is positioned one focal length from the optical means, substantially at the far-field image, the filter being divided into a plurality of spaced discrete areas, each area having relatively opaque and transparent portions defining the distinctive diffraction pattern of a different known character. Suitable optical means, such as a lens, is positioned to integrate the light passing through the filter and direct it to a first order, off-beam position. At the first order, off-beam position, light-responsive means is disposed at each of a like plurality of discrete areas, each of which is related to a particular filter area for producing a signal that corresponds to a predetermined amplitude of light passing through the filter or mask. In this off-beam arrangement, the light having significant signal content is gathered and directed to actuate the appropriate light-responsive unit, while extraneous light passes along the principal optical axis avoiding undesirable interference.

Moreover, the concept of the present invention inherently contemplates a unique method of making a filter or mask necessary for use in the system. The method includes the steps of intercepting a beam of collimated, coherent light with a character or symbol defined by the relatively opaque and transparent portions of a plane surface, generating diffraction patterns by positioning a two-dimensional diffraction means in the path of the light passing through the plane surface, focusing the diffraction patterns upon a recording plane, and simultaneously illuminating the recording plane with collimated, coherent light generated by the same source as the beam and from an off-axis position.

Thus, a characteristic diffraction pattern may be recorded upon the filter or mask such as a photographic film or plate and such diffraction patterns will contain not only amplitude information, but phase information, as well, in accordance with holographic phenomenon as a result of the secondary collimated beam of coherent light which impinges upon the recording plane of the filter or mask at the time the diffraction patterns are generated. The steps of creating a filter or mask in accordance with the method and concept of the present invention may employ a combination of equipment substantially the same as a portion of the equipment employed for the readout function previously described. It may include a source of a collimated, coherent beam of light, a character or symbol usually depicted by contrasting opaque and transparent portions in a determinable plane, a two-dimensional diffraction means, an appropriate lens or optical arrangement, a recording plane in the form of a photographic film or plate located one focal length from the lens or optical arrangement, and a secondary, off-axis beam of collimated, coherent light developed from the same source. The method of creating the filter or mask for each character or symbol which is desired to be able to read out is sequentially processed in the aforegoing described manner so as to create distinctive diffraction patterns located at predetermined different spatial areas of the filter or mask.

OBJECTS OF THE INVENTION

Accordingly, it is the primary object of the present invention to provide a character identification system of improved performance employing a two-dimensional diffraction means for developing a multiplicity of spatially disposed diffraction patterns which are distinctive of each character it is desired to identify.

Another most important object of the present invention is to provide such a character identification system which obviates the need to employ optical means for developing a multiplicity of diffraction pattern images from a single diffraction pattern.

It is another most important object of the present invention to provide an improved character identification system wherein a mask or filter includes a plurality of spatially disposed diffraction patterns each representative of a different character and containing phase information as well as amplitude information.

Another object of the present invention is to provide a character identification system wherein light sensitive identification means is disposed in the first order off-axis beam of the optical arrangement to improve its responsiveness and performance by minimizing extraneous light interference.

A further object of the present invention is to provide such a system wherein the diffraction means may be rotated about the principal axis relative to the character or symbol to minimize overlap of the plurality of diffraction patterns generated.

Another most important object of the present invention is to provide a method for creating a mask or filter which includes a plurality of different diffraction patterns each distinctive of a different character and containing phase information as well as amplitude information for improved identification of each character.

These and other objects, advantages, and features of the present invention will be better appreciated from an understanding of the operation of the several embodiments and methods disclosed herein together with the accompanying illustrative drawings.

BRIEF DESCRIPTION OF THE DRAWINGS

FIG. 1 is a schematic perspective illustration of a preferred embodiment of the present invention;

FIG. 2 is a schematic, perspective illustration of the method of making a mask or filter inherent in the concept and the teaching of the present invention;

FIG. 3 is an illustration of a typical filter or mask which may be made in accordance with the method taught by the present invention and employed in the character identification system of the present invention.

DESCRIPTION OF THE PREFERRED EMBODIMENT AND METHOD

Figure 4A:
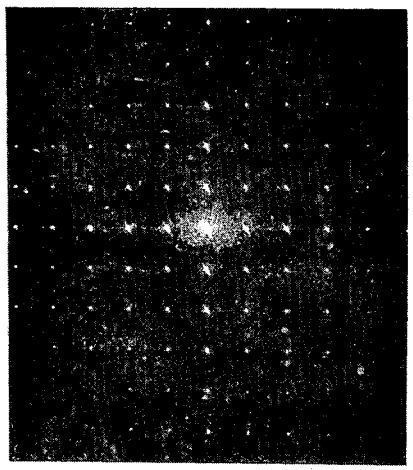
FIGS. 4, A, B, and C are photographs illustrating diffraction patterns generated employing the concepts and teaching of the present invention.

FIG. 1 is a schematic, perspective representation of a system in the form of a preferred embodiment of the present invention. A source of collimated, coherent light is provided at 10 and directed so that it impinges upon the character depicted on the plate 11. The plane of the plate 11 may include a photographic film or plate with relatively opaque and transparent portions defining the character it is desired to identify.

A two-dimensional diffraction means 12 is placed to intercept the collimated coherent light which passes through the character plane 11 and may comprise a grating, grid, or screen appropriately configured to provide two-dimensional diffraction. An optical means which may comprise a lens 13 having a determinable focal length is positioned at one focal length from the character plane 11 for forming far-field images in the form of a plurality of diffraction patterns which are distinctively generated by the collimated, coherent beam passing through the character plane 11 and the two-dimensional grid or diffraction means 12. Accordingly, there is generated a plurality of such substantially identical diffraction patterns in a plane one focal length from the optical means or lens 13. In the latter plane, there is positioned a filter or mask 14.

The filter 14 is created and prepared in a manner which will be described more fully hereinafter. It is sufficient for present purposes to point out that the filter 14 is divided into a plurality of spaced, discrete areas and each of the areas has relatively opaque and transparent portions which define the peculiarly unique diffraction pattern associated with and distinctively related to a known character. Accordingly, when the plurality of diffraction patterns generated by the character positioned in the plane 11 impinges upon the filter 14, only one of such patterns will match up in a congruent fashion and allow maximum light to pass therethrough. A certain amount of light does pass through, however, several of the other diffraction patterns associated with different characters.

Light passing through the filter 14 is collected by an optical means or lens 15 which has a determinable focal length and is positioned at one focal length from the filter 14. The light collected by the lens 15 is directed in part to a first order, off-axis beam position and focused in a plane one focal length from the lens 15. Positioned at the first order off-axis beam position and in the focal plane are a plurality of light-responsive or photosensitive means, each of which is spatially disposed in that plane at a position which is related to, and commensurate with, a discrete area of the filter 14 which defines a particular diffraction pattern associated with a single character.

Accordingly, in operation, a character or a symbol such as the letter A or any other distinctive character, symbol, alphanumeric, etc. is positioned in the character plane 11 in the arrangement illustrated in FIG. 1 to intercept the collimated beam of coherent light which is produced by the source 10. The collimated coherent light passes through the transparent portions of the plate or film depicting the character, impinging upon the two-dimensional diffraction means 12 which may comprise a diffraction screen, grating, or grid. A plurality of substantially identical diffraction patterns are produced and are brought into focus in a focal plane of the filter 14.

Filter 14, upon intercepting the diffraction pattern light, allows light to pass through only those portions of the mask diffraction patterns which are common with the diffraction pattern generated by the two-dimensional diffraction means 12 and are characteristic of the diffraction patterns generated by the particular character which is positioned in the character plane 11. The light thus passing through filter 14 is gathered by lens means or other appropriate optical arrangement positioned in the plane of lens 15 and a single-light pattern is created by integration and directed to a position which is correlated with the character to be identified.

A plurality of light-responsive or photosensitive devices is positioned one focal length from the lens 15 at a first order, off-axis beam position 16. Each of the photosensitive devices located in the plane 16 is disposed in a position commensurate with, and related to, the position of the diffraction pattern in the filter 14 which is uniquely distinctive of a particular character. Accordingly, the light-responsive or photosensitive means at each particular location is actuated to produce a signal which positively identifies a correlated character through the generation of uniquely distinctive diffraction patterns.

It should be noted that in the arrangement of FIG. 1, the use of a two-dimensional diffraction means such as a screen, grating, or grid, inherent in the concept of the present invention, generates a plurality of diffraction patterns rather than just a single diffraction pattern, therefore, obviating the need for employing relatively complex optical means to develop a plurality of diffraction patterns for purposes of filtering and identification. Moreover, the filter 14 when produced by the method conceived and taught by the present invention, contains not only amplitude information, but phase information as well, employing the holographic phenomenon as will be more fully explained, hereinafter.

Additionally, in the arrangement as depicted in FIG. 1, the photosensitive or light-responsive means positioned in the plane 16 is rendered significantly more sensitive and reliable to produce the properly correlated output signals in that extraneous light which passes through the main axis of the system is prevented from reaching the plurality of photosensitive, light-responsive devices. This is accomplished by having the photosensitive or light-responsive devices positioned in the plane 16 in a laterally disposed relationship, substantially at the first order, off-axis beam position. Accordingly, the light gathered and integrated by the lens 15 and directed to the first order, off-axis beam position in the plane 16 contains a minimum of extraneous light which may otherwise interfere with the effective operation and identification of each character as it passes through the character plane 11 to be identified.

The concept of the present invention inherently requires a novel method of developing and creating a filter or mask employing holographic techniques so that the filter contains not only amplitude information but phase information as well. FIG. 2 illustrates an arrangement of equipment which may be used in carrying out the steps of the method to create the filter employed in the present invention. A collimated beam of coherent light is generated by source 20 much in the manner illustrated in FIG. 1. That beam of collimated coherent light is intercepted by the character which it is desired to identify. The character may be the letter H as depicted in the character plane 21 of FIG. 2 and may typically be a film, plate or other means to provide relatively opaque and transparent portions which cooperatively define the character by allowing the collimated coherent light to pass through the transparent portions and by interrupting the passage of light at the opaque or non-transparent portions.

That amount of light which passes through the character plane 21 impinges upon a two-dimensional diffraction means 22 which generates replication diffraction patterns uniquely typical of the character interposed in the character plane 21. The diffraction patterns are focused by a appropriate optical arrangement or lens 23 upon a discrete portion of a filter 24 located in a recording plane. The lens 23 is positioned one focal length from the character plane 21 and also one focal length from the recording plane which includes the filter 24. The filter 24 may be a photographic film or plate exposed for recording the diffraction pattern.

A collimated beam which may be generated by the same source as indicated at 20 is directed obliquely as at 25 to impinge upon the filter 24 concurrently with the diffraction pattern developed by the two-dimensional diffraction means 22. It should be noted that the angle $\theta$ between the obliquely oriented beam of collimated, coherent light, and the axis of the main beam of collimated, coherent light, is the same as the angle $\theta$ illustrated in FIG. 2.

Thus, the light interference patterns which are established and recorded on the filter 24 contain phase information as well as amplitude information in accordance with holographic techniques and phenomena. Each discrete area or section of the filter 24 is recorded in like manner by uncovering a new area of unexposed film so that each new diffraction pattern is directed to a different discrete area of section of the filter and a different filter area is uniquely associated with each character. Accordingly, a multiple filter with any reasonable number of known diffraction pattern filter areas may be created as described in connection with the explanation of the novel method employing the equipment of FIG. 2 and producing a multiplicity of unique discrete areas as illustrated by FIG. 3.

FIG. 3 illustrates a multiple area filter which is divided into 49 discrete areas in a 7 × 7 square configuration. As illustrated, the diffraction pattern filter for signal No. 1 containing the diffraction pattern information in accordance with the teaching of the method previously described may be recorded in the first box at the upper left-hand corner; the diffraction's pattern for signal No. 2 may be recorded in the second box immediately adjacent that of signal No. 2, and the distinctive diffraction pattern for signal No. 3 in the third box, etc. to form a number of $n$ signal records in accordance with the capacity of the multiple filter and the number of discrete areas into which it is divided.

FIG. 3 illustrates that the central discrete area is blacked out so as not to be usable. The reason for this will be better understood by referring to FIGS. 4, A, B, and C. FIG. 4A is a photograph of the actual replication diffraction pattern produced by a system substantially of the type shown in FIG. 1 but without a character in the character plane, so that the replication diffraction pattern is substantially that of the beam. It will be noted that a good multiple pattern is produced in a 7 ×7 configuration in the middle of the entire pattern. However, the centermost area within the 7 × 7 configuration contains a distinctly higher amplitude of light concentration as contrasted to the other areas within the 7 × 7 configuration. Accordingly, for reasons of practical operation and reliability of the system, it may be prudent to eliminate the use of the central area by blocking it out as illustrated in FIG. 3.

Figure 4B:
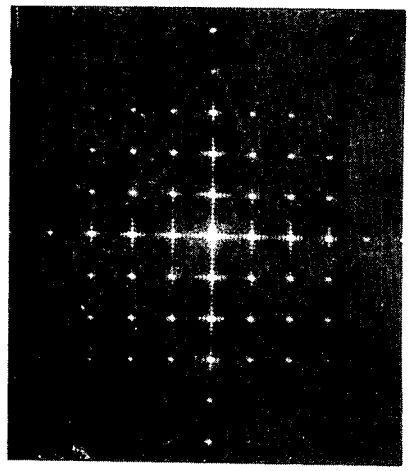

FIG. 4B shows the multiple, distinctively unique, diffraction patterns generated in a system of the type illustrated in FIG. 1 by the insertion of the character H in the character plane 11. It will be seen, as illustrated in FIG. 4B, that the character of the plurality of diffraction patterns produced is substantially identical, though varying in size.

Figure 4C:
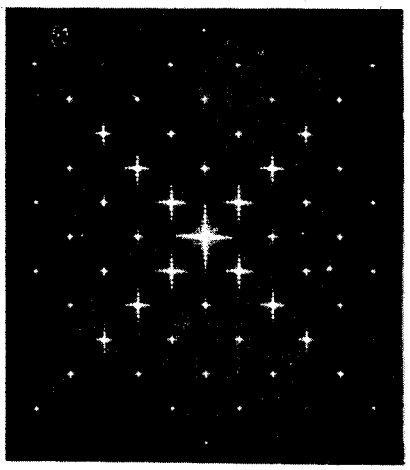

It may be found to be highly advantageous to rotate either the character or the two-dimensional diffraction means about the axis of the collimated beam to provide an improved separation of the plurality of diffraction patterns generated. FIG. 4C is a photograph illustrating the multiplicity of diffraction patterns generated by the character H inserted in a system of the type illustrated in FIG. 1, with either the character or the two-dimensional diffraction means rotated 45° relative to each other and about the principal axis of the collimated beam generated by the source 20. With the improved separation realized by this technique, there is less overlap of the signals as is clear by comparison of the substantially same diffraction patterns generated by the letter H as shown in the FIG. 4B as contrasted to those of the FIG. 4C.

FIGS. 5A through 5E illustrate larger diffraction patterns showing more detail of the distinctively unique patterns developed by different characters for purposes of demonstrating how different characters may be positively and reliably identified employing the concept and teaching of the present invention.

Figure 5A:
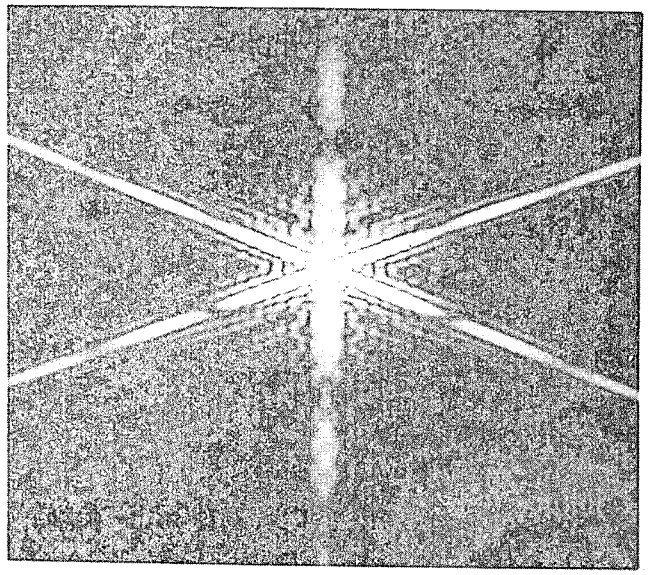
FIGS. 5, A, B, C, D, and E are photographs of larger, more detailed diffraction patterns generated by different characters and employing the teaching and concept of the present invention.

FIG. 5A is a diffraction pattern generated by use of the present invention by inserting the letter A in a system of the type illustrated in FIG. 1.

Figure 5B:
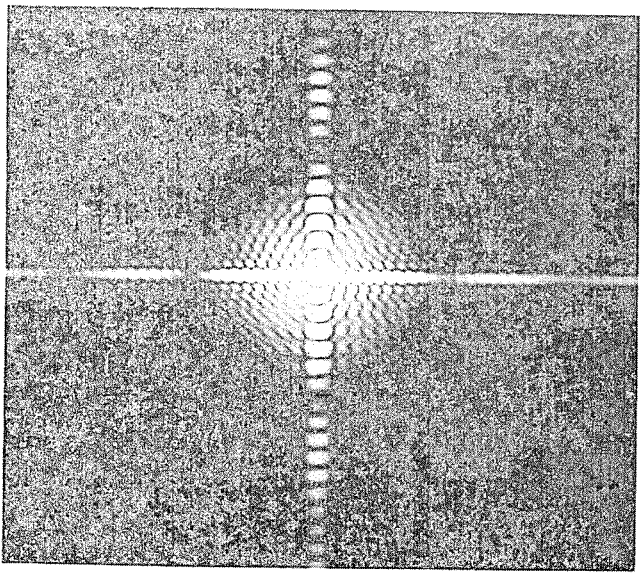

FIG. 5B is a diffraction pattern generated by inserting the letter P in a system of the type illustrated in FIG. 1. It will be noted that while the letter A is comprised entirely of straight lines and produces a straight line pattern, the letter P, being comprised of both straight lines and a curved portion, develops a diffraction pattern with both straight line and circular diffraction aspects.

Figure 5C:
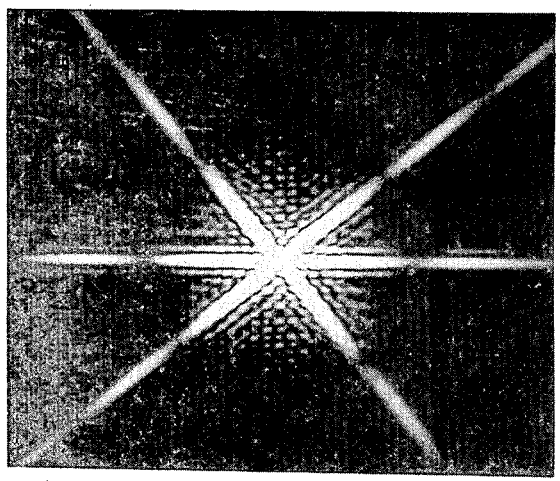

FIG. 5C illustrates a diffraction pattern developed by the letter K when inserted in the apparatus employed in the present invention as depicted in FIG. 1. It will be noted that the letter K, which is comprised entirely of straight lines, produces a substantially straight line diffraction pattern, but at distinctly different angular aspects as compared with the diffraction pattern produced by the letter A, thereby making it uniquely distinctive and readily identifiable with the letter K.

Figure 5D:
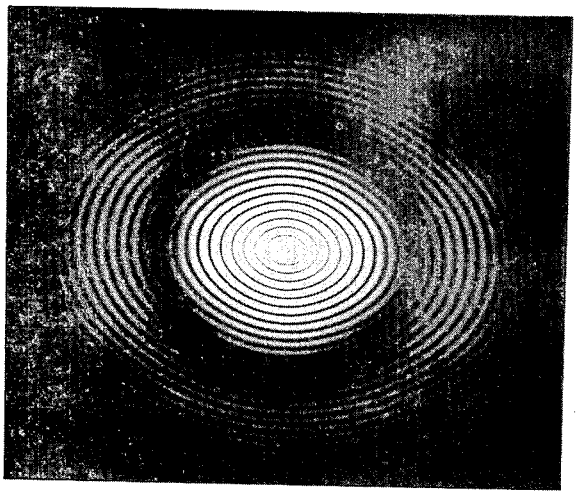

FIG. 5D is a photograph illustrating in considerable detail the distinctively unique diffraction pattern generated by the letter O. The letter O is entirely curvilinear in nature, and the diffraction pattern similarly is entirely curvilinear in nature and devoid of any straight line characteristics.

Figure 5E:
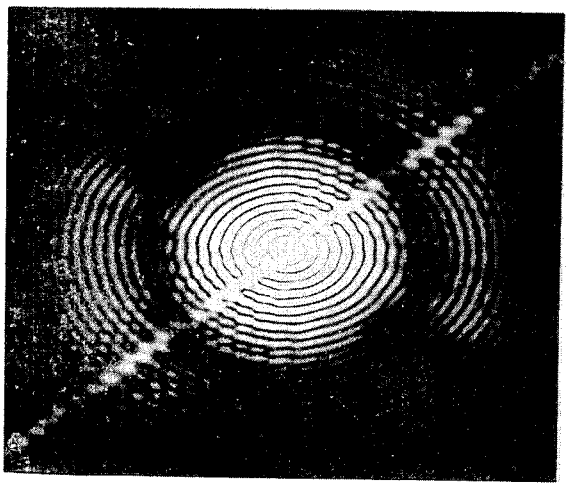

This is in marked contrast to the diffraction pattern depicted by the photograph of FIG. 5E (which is generated by the photograph of FIG. 5E) which is generated by the letter Q. Since the letter Q used was comprised of curvilinear as well as a small straight line portion, the diffraction pattern has both curvilinear and straight line characteristics.

It should be borne in mind that each of the diffraction patterns illustrated in FIGS. 5A through 5E represents only one of a plurality of like patterns replicated in the use of the present invention.

Those knowledgeable in these arts will readily appreciate that the concept of the present invention affords significantly improved character identification by including holographic information in both the method of creating the mask or filter which is used in the system, and in the use of the novel system.

By combining data processing and computing techniques with the improved system of the present invention, information contained in characters, symbols, etc. may be transformed or translated to enhance its usefulness.

We claim:
1. A character identification system comprising:
   a source of collimated coherent light;
   a substantially plane surface having relatively opaque and transparent portions defining a character to be identified, said surface being positioned to intercept said collimated coherent light;
   a two-dimensional diffraction means positioned in the path of the collimated coherent light passing through said relatively transparent portions for forming a plurality of spatially disposed diffraction patterns of said character to be identified;

first optical means having a determinable focal length and positioned one focal length from said surface for forming a far-field image of said plurality of diffraction patterns;

a filter positioned one focal length from said first optical means substantially at said far-field image, and being divided into a plurality of spaced discrete areas, each said area having relatively opaque and transparent portions defining the diffraction pattern of a known character;

second optical means having a determinable focal length and positioned one focal length from said filter; and a plurality of light-responsive means positioned in an off-axis plane one focal length from said second optical means, each of said light-responsive means being spatially disposed in said plane at a position commensurate with a related discrete area of said filter for producing a signal in response to a predetermined amplitude of light impinging thereon.

2. A character identification system as defined in claim 1 wherein said relatively transparent portions of said plane surface are in the form of the diffraction pattern of a character to be identified.

3. A character identification system as defined in claim 1 wherein said relatively opaque portions of said plane surface are in a form of the diffraction pattern of a character to be identified.

4. A character identification system as defined in claim 1 wherein said two-dimensional diffraction means comprises a fine mesh screen.

5. A character identification system as defined in claim 1 wherein said two-dimensional diffraction means comprises a two-dimensional diffraction grating.

6. A character identification system as defined in claim 1 wherein said plurality of light-responsive means are positioned in the first order off-axis beam.